(12) United States Patent
Junker

(10) Patent No.: US 9,358,605 B2
(45) Date of Patent: Jun. 7, 2016

(54) METHOD AND PRODUCTION LINE FOR MACHINING A CRANKSHAFT

(75) Inventor: Erwin Junker, Buehl/Baden (DE)

(73) Assignee: Erwin Junker Maschinenfabrik GmbH, Nordrach (DE)

( * ) Notice: Subject to any disclaimer, the term of this patent is extended or adjusted under 35 U.S.C. 154(b) by 177 days.

(21) Appl. No.: 14/117,812

(22) PCT Filed: May 16, 2012

(86) PCT No.: PCT/EP2012/059182
§ 371 (c)(1),
(2), (4) Date: Dec. 17, 2013

(87) PCT Pub. No.: WO2012/156469
PCT Pub. Date: Nov. 22, 2012

(65) Prior Publication Data
US 2014/0109364 A1    Apr. 24, 2014

(30) Foreign Application Priority Data

May 17, 2011   (DE) .......................... 10 2011 076 007
May 31, 2011   (DE) .......................... 10 2011 076 809

(51) Int. Cl.
*B23C 3/06*    (2006.01)
*B21H 7/18*    (2006.01)
(Continued)

(52) U.S. Cl.
CPC  *B21H 7/185* (2013.01); *B23B 5/18* (2013.01); *B23B 29/248* (2013.01); *B24B 5/42* (2013.01); *B24B 51/00* (2013.01); *B23B 2215/20* (2013.01); *Y10T 29/17* (2015.01); *Y10T 29/49286* (2015.01)

(58) Field of Classification Search
CPC .............. B23B 3/06; B23B 3/22; B23B 5/18; B23B 29/248; B23B 2215/20; B23C 3/06; B23C 3/08; B24B 19/12; B24B 51/00; B24B 5/42; B21H 7/185; Y10T 29/49286; Y10T 29/17
See application file for complete search history.

(56) References Cited

U.S. PATENT DOCUMENTS 2,160,402 A * 5/1939 Groene .................... B23B 5/18
                                                    82/106
2,174,083 A * 9/1939 Groene .................... B23B 5/18
                                                    82/106
(Continued)

FOREIGN PATENT DOCUMENTS

DE    2836598 B1    2/1980
DE    3939935 A1    6/1991
(Continued)

OTHER PUBLICATIONS

German Office Action for Application No. 10 2011 076 809.2 dated Apr. 10, 2013.
(Continued)

*Primary Examiner* — David Bryant
*Assistant Examiner* — Jun Yoo
(74) *Attorney, Agent, or Firm* — Marshall, Gerstein & Borun LLP

(57) ABSTRACT

A method for completely machining at least unprocessed centric journals (10) and crankpin journals (11), and the respective flat shoulders (9, 10) thereof surrounding the journals, of flanged or cast blanks of a crankshaft first includes turning the flat shoulders (9) associated with the journals (10). Then, the centric journals (10) are roughly ground without the flat shoulders (9) thereof and the crankpin journals (11) are roughly ground together with the flat shoulders (12) thereof. After the journals (10, 11) have been roughly ground, an allowance remains that is smaller than an allowance required for common finish grinding of journals and flat shoulders. The rough grinding is followed by the finish grinding of the centric journals (10) and the crankpin journals (11) from the smaller allowance (23) remaining due to the rough grinding to the final dimension.

10 Claims, 12 Drawing Sheets

(51) Int. Cl.
   *B23B 5/18* (2006.01)
   *B23B 29/24* (2006.01)
   *B24B 5/42* (2006.01)
   *B24B 51/00* (2006.01)

(56) References Cited

U.S. PATENT DOCUMENTS

| | | | | |
|---|---|---|---|---|
| 2,182,228 | A | * | 12/1939 | Groene ............... B23C 3/06 29/888.08 |
| 2,249,242 | A | * | 7/1941 | Groene ............... B23P 25/00 29/888.08 |
| 4,261,234 | A | | 4/1981 | Berbalk |
| 5,303,468 | A | * | 4/1994 | Cieszkiewicz ........ B21K 1/08 29/428 |
| 6,878,043 | B1 | * | 4/2005 | Junker ............... B24B 5/42 451/249 |
| 2009/0080991 | A1 | * | 3/2009 | Grimm ............... B23C 3/06 409/287 |

FOREIGN PATENT DOCUMENTS

| | | |
|---|---|---|
| DE | 19749940 C5 | 5/1999 |
| DE | 102004057111 A1 | 6/2006 |
| DE | 102010025132 A1 | 2/2011 |
| FR | 2779075 A1 | 12/1999 |
| JP | 59107801 A | 6/1984 |
| WO | WO-03/022521 A1 | 3/2003 |

OTHER PUBLICATIONS

International Search Report for Application No. PCT/EP2012/059182 dated Aug. 31, 2012.

* cited by examiner

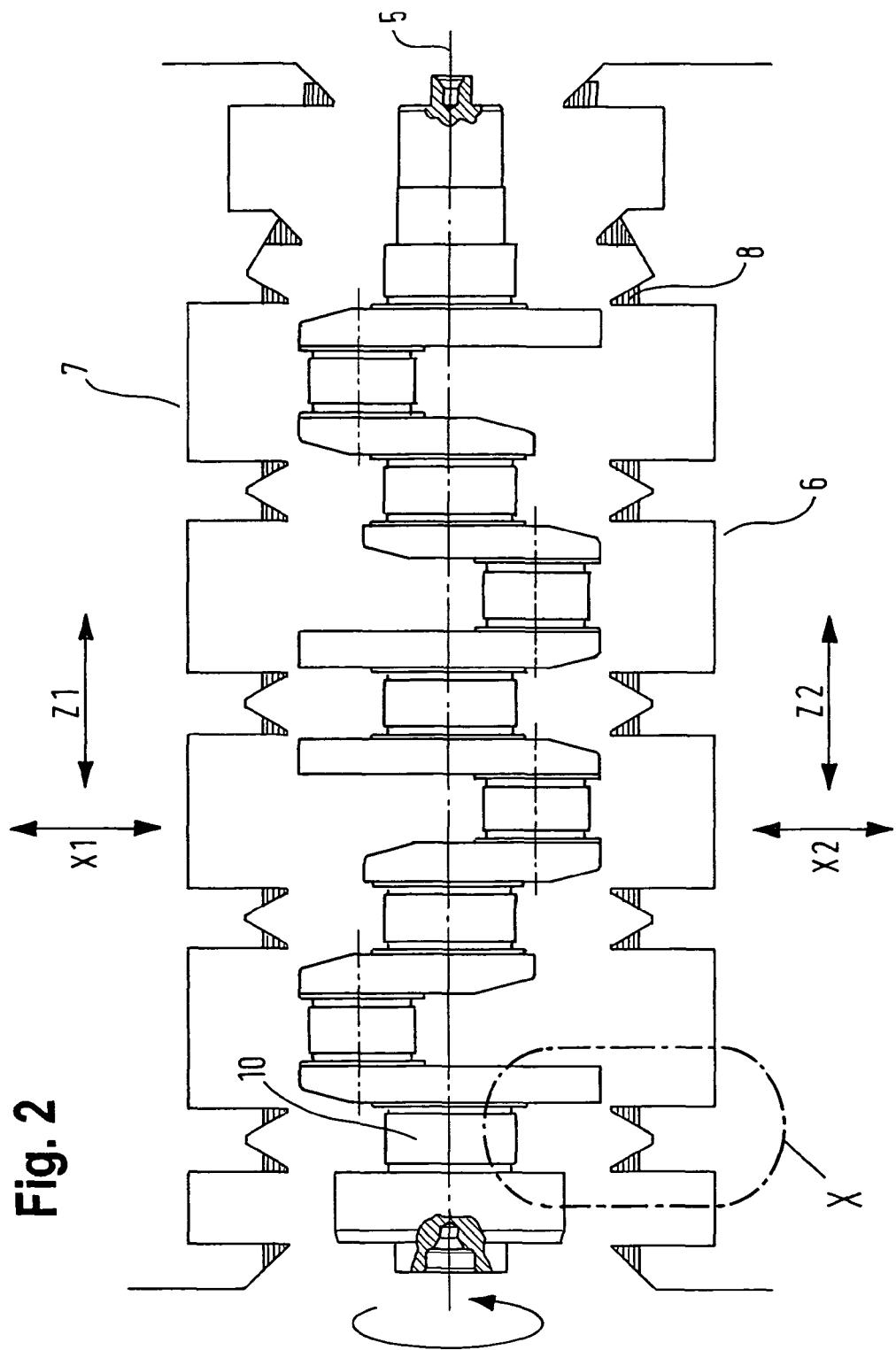

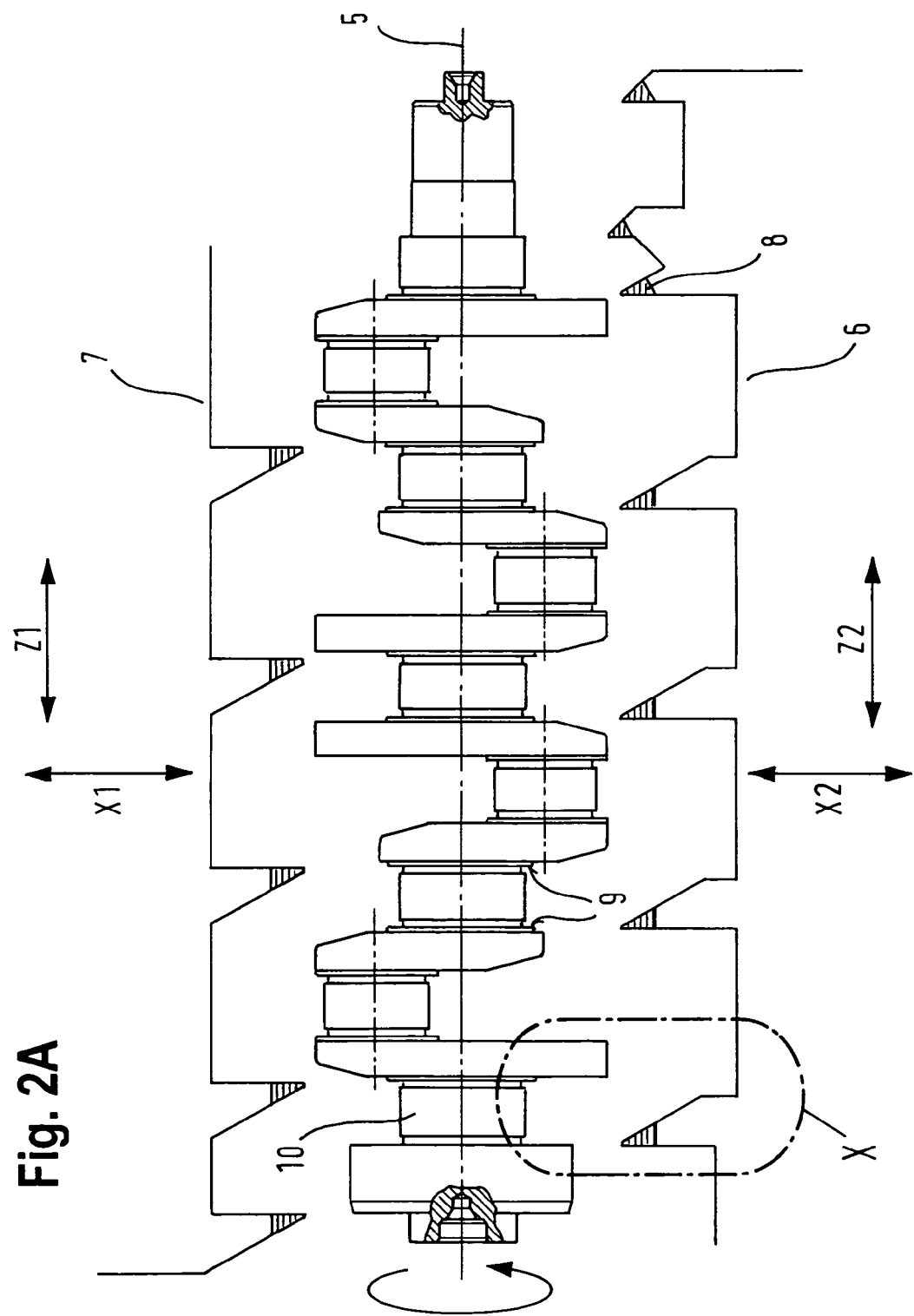

METHOD AND PRODUCTION LINE FOR MACHINING A CRANKSHAFT

CROSS-REFERENCE TO RELATED APPLICATIONS

This is the U.S. National Stage of International Patent Application No. PCT/EP2012/059182, which has an international filing date of May 16, 2012, and claims priority benefit of German patent application nos. 10 2011 076 007.5, filed May 17, 2011 and 10 2011 076 809.2, filed May 31, 2011. The entire contents of each of the foregoing are hereby incorporated herein by reference.

BACKGROUND

The present disclosure relates to a method for complete machining of at least unmachined journals and flat shoulders of forged or cast blanks of a crankshaft and to a production line for carrying out this method.

Since crankshafts constitute a central component in particular in reciprocating internal combustion engines and this type of internal combustion engine has been used successfully for decades, for an equally long time the manufacturing technology has been concerned with an improvement not only in the accuracy of production but also the economics of production.

One difficulty in the complete machining of crankshafts is that the crankshaft blanks which are frequently supplied as forgings or castings must be subjected to machining not only of the main bearing journals and crankpin journals, but also the flat faces of the flanks, the flat end faces and also a connecting flange and centring and/or oil supply holes.

The forged or cast blanks have a relatively large oversize, in particular at the crucial locations such as for example main bearings, pin bearings, flat shoulders, flange bearings, which must be removed by machining. In order that a blank can be subjected to subsequent machining, this blank must be machined with flat faces flat at its ends, and centring holes must be introduced there. This is necessary in order that the crankshaft to be machined can be gripped exactly and reproducibly on the respective machine tools in order to achieve a high manufacturing accuracy.

In the context of this present disclosure blanks are forged or cast blanks which are merely machined with flat faces on their ends and have centring holes.

In the case of blanks for a crankshaft, the main bearings, pin bearings, grooves and recesses, flange bearings, flange and pin diameter, optionally concentric profiles and side flank surfaces and outer flank diameter including chamfers, must be machined. In addition, crankshafts must be provided with oil holes so that numerous manufacturing steps are necessary in order to make a finished completely machined component from a forged or cast crankshaft blank.

The course of technical development with respect to the manufacture of crankshafts has concentrated on largely combining the different technological manufacturing operations, such as milling, turning, grinding and drilling, as far as possible on individual manufacturing centres. This development also included the trend towards increasing the proportion of grinding operations in the number of operations for complete production of the crankshaft, above all things because of the high manufacturing accuracy which can be achieved thereby. Nevertheless turning and grinding machines are combined in production lines for complete machining of crankshafts, in order in particular that those operations which can be produced more favorably by turning are carried out on a turning machine, but those operations which can be produced more precisely and better on grinding machines are carried out on these grinding machines.

Because of the relatively large oversize, which may amount to 5 mm and more, the machining of a crankshaft differs according to the design, size, hardness, type and batch size. In any case the machining begins with rough machining, in which for example the crankshaft is milled at the ends to the correct length and centring holes are also introduced at these ends. This is followed by machining of the main bearing surfaces and also of the pin bearings. Turning and milling, in particular trochoidal milling, as well as turn broaching are widely used as machining techniques for this rough machining. For the main bearing surfaces, for example, rough grinding may also be carried out. Pin bearings are being predominantly milled. Turn broaching and also grinding are likewise used.

Complete machining of a crankshaft includes numerous further method steps such as drilling of oil channels, which can be performed for example using deep drilling techniques, induction hardening for improvement of the wear resistance, as the bearing running surfaces are hardened and the fatigue strength is increased by generation of compressive residual stresses in particular in the radii. This operation is performed by heating, quenching and tempering. Further technological processes are rolling of the radii or radius induction hardening in order to increase the fatigue strength. Likewise nitriding of a finish-machined crankshaft can be used for improvement of the wear and fatigue behavior. Main bearings and pin bearings are frequently also ground, as are the ends of the crankshafts, i.e. the journals and flange ends thereof. Grinding has particular advantages in terms of roundness, surface quality, straightness, optionally iconicity, dimensional stability, etc.

In the context of the present disclosure, complete machining should be understood to mean complete machining of unmachined central journals as well as unmachined crankpin journals and also the respective flat shoulders, which are likewise unmachined and surround the journals, of forged or cast blanks of a crankshaft. Although the present disclosure does include all the operations for complete machining of a crankshaft in the broadest sense, the crux of the present disclosure extends to the above-mentioned machining of journals and flat shoulders on forged or cast blanks of a crankshaft.

In the prior art it is known in principle to machine flat faces. In known installations these machining operations are preferably carried out by means of trochoidal milling or turn broaching. In this case hard metal or polycrystalline diamond plates are disposed on a disc. With such machines it is possible, when machines with one or two tool headstocks are used, for one or two bearing points in each case to be machined one after the other and sometimes simultaneously. Such machines are not only expensive to procure, machining of individual bearings also leads to relatively long machining times, so that for known crankshaft production lines a considerable number of these machines is necessary, which makes the crankshaft manufacture very expensive overall.

The trochoidal milling or turn broaching has found widespread use in the manufacture of crankshafts. The disadvantages of these methods, i.e. trochoidal milling or turn broaching, often reside in the fact that that in principle these methods are carried out dry, i.e. a cooling liquid is not used. Furthermore the tools for the turn broaching and trochoidal milling are very complicated, because these are disc-like components which have plates which produce the actual free-cutting function on the end faces in the circumferential region. These plates must be individually adjusted very precisely so that during the free-cutting machining the most uniform material removal possible is carried out, and on the other hand the plates are also uniformly loaded. Since these plates are disposed at defined intervals on the periphery, a relatively untidy surface contour is also produced which may also be designated as scaly. Under these circumstances the result of the rough machining has a negative effect on the subsequent fine machining operations, because the tools used therefore initially have to offset the rough and uneven surface. This in turn presupposes that a relatively large oversize must be maintained for the final machining as a result of the rough machining. The tools used for trochoidal milling or turn broaching also require long periods of time in order to replace the worn plates. Several hours are frequently necessary for this. The makes the production process more expensive. However, since crankshafts are frequently mass-produced cost-effective solutions must be sought.

During the rough machining it is known that a relatively large amount of material is removed, which, in particular in the case of methods with dry machining, leads to a substantial heat input into the crankshaft to be machined. This substantial heat input leads, in addition to the high machining forces because of the engagement of the tools on the component to be machined, to a deformation of the component with a disadvantageous effect on the accuracy to be achieved later. The heat input into the crankshaft as a result of the rough machining also leads to the relief of stresses in the component, which likewise lead to distortions of the component. Furthermore the rough machining leads to significantly higher loads on the tools in this technological step by comparison with fine or final machining.

Therefore attempts have been made to replace the trochoidal milling and turn broaching by grinding operations. However, when machining such blanks it should be noted that, because of the necessary large amount of material to be removed, pre-grinding operations are generally associated with relatively high wear on the grinding wheels (in particular on the flat faces).

The grinding itself will generally be carried out as a wet machining operation, because this is performed with cooling lubricant. Thus less heat is introduced into the component by the grinding, and also the machining forces are lower, so that the deformations due to the processing on the crankshaft during grinding can be reduced. The has a direct positive effect on the accuracy of the crankshaft, so that truer running of a finished crankshaft can be achieved.

This is particularly critical when machining the flat shoulders of the central journal regions, because these flat shoulders have a significantly greater height than the flat shoulders on the crankpin journal of the crankshaft. For the trochoidal milling method or the turn broaching method this means that the numerous cutting plates disposed on the external periphery of the tool undergo substantial unilateral loading during the machining of the flat shoulders, whereas large parts of these cutting plates do not come into engagement at all with the workpiece to be ground, i.e. the crankshaft, during the machining of the flat shoulders. As a result the machining tools wear relatively quickly and have to be fitted with new cutting plates at comparatively short intervals. The leads to an increase in the cost of the production process because the fitting of new parts is a time-consuming operation. Only after the flat shoulders have been completely machined do the other regions of the trochoidal milling or turn broaching tools take part in the machining as they machine the immediate journal regions. As already described above, the result of the machining by turn broaching or trochoidal milling is a relatively "scaly" surface. Such an irregular and relatively rough surface has considerable disadvantages for subsequent finish machining operations. If the final machining operations are performed as usual by grinding, then the tools employed there must engage in a relatively uneven and rough surface, which leads to considerable wear on the grinding wheels used therefor. Because of the only relatively harsh surface which can be achieved by this pre-machining by trochoidal milling or by turn broaching, a relatively large oversize with respect to the final dimension to be achieved must be maintained after the rough machining so that all errors can still be compensated for by means of final machining. The crankshaft blanks machined in this way are also designated as pre-machined crankshafts. For these pre-machined crankshafts a conventional finish machining is then carried out in such a way that first of all pre-grinding is carried out, followed by finish grinding or fine grinding. These two methods are generally carried out by two different grinding wheels, because on the one hand a relatively large oversize is still to be abraded, which for a fine grinding machine would constitute an excessive strain, and because on the other hand the surface is relatively rough, which would likewise lead to relatively fast wear of a fine-grinding wheel, with the negative result that the high quality requirements for a crankshaft could not be attained or could be attained only with difficulty.

Attempts have been made to minimize this disadvantage, by the use of mixed methods for machining crankshaft blanks, i.e. by combining methods consisting turn broaching and trochoidal milling as well as grinding with one another in such a way that in the case of a main bearing the flat faces have been machined by means trochoidal milling or turn broaching, followed by grinding of the main bearing journal, so that a steady rest for the further machining operations can be used there. Ultimately, these combined methods still have the disadvantages which are manifested directly on the component in connection with the trochoidal milling and turn broaching. These disadvantages are the high loads also resulting from dry machining, high surface roughness and the deformations of the crankshaft as a result of this machining.

In order to eliminate the above-mentioned disadvantages of the previously customary machining methods for crankshafts in the rough machining such as turn broaching and trochoidal milling, attempts have been made to completely grind the crankshafts, i.e. to perform the rough machining by rough grinding.

In the known production methods for crankshafts, in which the crankshaft blanks are already roughly pre-machined, i.e. in which both flat surfaces and also journal regions for example have also been roughly pre-ground, the main focus was the finish machining of the crankpin journal and also the main bearing journal as well as the flat shoulders on a finish grinding machine which performs the operations of pre-grinding and finish grinding. Already the sequence of the machining of crankpin journals and main bearing journals has a effect on the precision to be achieved later. Thus this section of the method has not only attracted the highest attention, but also special grinding wheels have been developed for carrying out these complex grinding operations, including such grinding wheels, in which a readjustment of the width of the grinding wheels was possible. This shows that, in order to ensure above all the quality of the crankshafts, in particular the grinding operations have been perfected.

In spite of this perfected mode of production in the field of grinding it has been ascertained that in particular the wear on grinding wheels as a result of the grinding of flat shoulders and bearing journals is unsatisfactorily high. This applies in particular to the large flat shoulders on the central journal regions and in particular to the rough grinding operation. This rough grinding was performed by plunge grinding, so that both flat shoulders which enclose the respective journal between them are ground simultaneously. If the grinding wheel is plunged into this region for purpose of grinding the flat shoulders, basically only the direct edge regions of the grinding wheel are most highly loaded, whereas the abrasive grains disposed there between over the width of the grinding wheel do not have to perform any grinding work. This leads to substantial wear on the rough-grinding wheels, so that the service life of this grinding wheels is unacceptably short. Therefore in this type of rough grinding only as much as is absolutely necessary of the oversize on the central bearing points is removed by grinding, so that a considerable oversize still remains for the final machining. Improved grinding wheel materials have not provided a sufficient remedy for this problem.

The considerable disadvantages with regard to precision, required performance and cycle time as well as costs of the methods of turn broaching and trochoidal milling, rough grinding and a combination thereof do not therefore meet the existing requirements in particular for mass production.

Therefore the object of the present disclosure is to provide or optimize a method for complete machining of crankshaft blanks which are, if need be, pre-machined with flat faces at the ends, as well as a production line necessary for carrying out the method with the appropriate production operations for mass production in such a way that the tool wear as well as the tool costs and thus the unit costs of the crankshafts can be reduced and the total production process can take place more cost-effectively, and with high production precision of the crankshaft.

Surprisingly it has been shown according to the present disclosure that—contrary to the previous course of the technical development—by separation or sub-division of the different steps of the total production process, namely by turning away from the hitherto conventional procedure, the aforesaid problems can be remedied, in that above all the rough grinding, turn broaching or trochoidal milling part of the rough machining which includes the grinding of the large flat shoulders on the central journals, is instead subjected to a normal turning operation. Since the rough-grinding wheels and the tools for turn broaching or trochoidal milling now no longer have to be used for machining the flat shoulders on the central journal regions, the service life thereof is extended considerably. However, the tools are also subjected to a more uniform loading, since in the rough machining of only the journals the cutting plates or the grinding wheel grains come into engagement immediately and totally. A special advantage is offered by the rough grinding in particular of the central journals, after the flat shoulders thereof have been turned. During the rough grinding may the cutting speed can be significantly increased relative to the rotary milling or turn broaching, a fixed tool being present in the case of turn broaching. In spite of the increased cutting speed the heat input during grinding is considerable lower, so that the crankshaft undergoes less deformation and so that in addition to a smoother and more uniform surface a lesser run out can be achieved. Thus in the case of rough grinding according to the present disclosure of only the central journal regions on the blank a greater part of the oversize present on the unmachined blank can be ground by means of the grinding with cooling and grinding oil being supplied. This means that with the method according to the present disclosure the rough machining can be carried out to far into the part of the oversize which hitherto had to be provided for the known finish grinding. Thus the rough grinding not only relieves the load on the tools during final grinding, but therefore also during finish grinding considerably less material has to be removed in order to grind to the final dimension. Therefore during finish grinding this can take place in a single operation, so that the previously conventional sub-division into pre-grinding with a pre-grinding wheel and finish grinding with a finish-grinding wheel is often no longer necessary. Instead grinding can be performed in a single operation with one single fine-machining grinding wheel without this latter being overloaded. Because in the fine grinding less of the oversize is to be removed, the loads on the crankshaft during the finish grinding are reduced, which has a directly positive effect on the achievable quality of the crankshaft.

The combination according to the present disclosure of turning the flat shoulders and rough grinding of the journal regions is carried out by an intelligent sub-division of these production processes in the context of optimizing the deformation of the crankshaft during the machining and in the context of optimizing the oversize. With regard to the technological operating sequence, according to the present disclosure those parts (the flat shoulders of the central journals) which can be produced significantly more effectively by turning in an optimal manner of workpiece deformation, heat input, machining precision are turned, whereas the rest of the machining is relieved of high loads. Thus with regard to the technological operating sequence turning is deliberately employed again and, as it were, freed from a complete grinding machining in order to be able to carry out the total production process overall more cost-effectively and with a higher quality of the workpiece. The grinding is carried out by means of rough grinding machining more precisely overall than machining by means of grinding of flat shoulders and journal regions in a single operation by means of a plunge grinding operation.

In the case of pin bearings, on the other hand, rough grinding is retained for both the flat shoulders there and also the crankpin journals. On the one hand a machine for turning a section which moves eccentrically when the crankshaft rotates would be difficult to design, whilst on the other hand the flat shoulders on the crankpin are clearly smaller than those on the central journals. In addition, in the case of the pin bearings a somewhat greater oversize must be retained from the outset after the rough machining because of the angle error which occurs. It must still be possible to compensate for this angle error in the final machining. Therefore it is also tolerable to grind the flat shoulders at the same time, since the negative effect of the wear on the grinding wheel is clearly less in the case of the pin bearing. This is taken into account in the context of the overall process optimization.

Accordingly, rough grinding within the context of the present disclosure is the machining of the central journals, optimized in relation to the oversize, and thus the relief of the load on the finish grinding operation to be carried out thereafter. For the forged or cast blanks oversizes of in some cases more than 5 mm are quite usual. In known methods in which prefabricated crankshafts are machined, the pre-machining of the journals was undertaken to such an extent that for the final machining an oversize of for example 1.8 to 2 mm was still to be removed. In the case of the present invention is the rough machining until in a region of for example 0.5 to 0.7 mm oversize relative to the final dimension carried out. An almost purely fine-grinding operation remains as finish grinding operation, without pre-grinding having to be carried out. In final grinding according to the invention any modifications of the grinding conditions to be adapted are merely implemented by way of the advance and cutting speed of the finish grinding machine.

Thus the advantage of the method according to the present disclosure lies inter alia in the optimization of the production operations so that the significantly smaller size of the flat shoulders of the pin bearings can also be completely achieved by grinding, whereas the significantly higher flat shoulders of the central journals are now pre-turned instead of pre-grinding, turn broaching or trochoidal milling. Thus the effect according to the present disclosure is greatest, without loss of precision and production time or production costs. In this way the centrally disposed high flat shoulders can be produced, preferably simultaneously, by means of cost-effective tools.

The method according to the present disclosure implements a complete machining from forged or cast blanks of a crankshaft, wherein at least the unmachined central pins and crankpin journals as well as the respective flat shoulders thereof which surround the journals, i.e. enclose the journals between them, are completely machined. Therefore complete machining, in particular for the said sections of the crankshaft, is understood to be machining of the rough contour of the blank the crankshaft to the final dimension thereof. According to the present disclosure the flat shoulders associated with the central journals are turned. In this case the turning takes place by means of conventional rotary tools, which are fixed and for purpose of turning are brought into engagement with the rotating crankshaft. Then the central journals as well as the crankpin journals and the flat shoulders thereof are rough-ground. The grinding of the central journals takes place so that in this case the grinding wheel no longer comes into engagement with the flat shoulders present there. As a result the grinding wheel is considerably relieved of load and can rough-grind the oversize on the blank to nearer to the final dimension. Thus after the rough grinding of the journals an oversize remains which is smaller than an oversize necessary for conventional known finish grinding of journals and flat shoulders. With regard to the oversize which is to be removed by the rough grinding according to the present disclosure and the final grinding according to the present disclosure, these two operations are not comparable with the operations used in the prior art. By comparison with the conventional final grinding, the finish grinding according to the present disclosure is relieved of load by the oversize of which more is removed by the rough grinding according to the present disclosure by comparison with the known oversize.

The complete machining is then concluded, as after the rough grinding the central journals and the crankpin journals and preferably also the flat shoulders of the crankpins are finish-ground to the final dimension from the smaller oversize achieved or left by the rough grinding. On the basis of the complete machining, which according to the invention is optimized in relation to the oversize, of at least the journals and flat shoulders of forged or cast blanks of a crankshaft, in addition to a significant reduction in the cycle time in the production of a crankshaft a higher degree of precision thereof is achieved. It is particularly preferable if the flat shoulders of the crankpins are already ground to the final dimension in the rough grinding.

As the flat shoulders, in particular the central journals and in particular all journals, are turned simultaneously, the production time can be further reduced. The loading exerted on the crankshaft during the machining of the crankshaft can be further reduced by the simultaneous turning of all flat shoulders, in particular of the central journals, which has a positive effect on its quality.

The flat shoulders of the central journals are preferably turned in groups. In this case a first group is turned by advancing the rotary tools from a first side of the crankshaft and a second group is turned from a second side of the crankshaft opposite the first side The simultaneous turning of the flat shoulders in groups from two opposing sides of the crankshaft has the advantage that machining forces introduced into the workpiece during turning can be compensated for at least to a certain extent.

Preferably the two groups may each comprise all flat shoulders the central journals. This means that all the flat shoulders can be turned by rotary tools from both sides of the crankshaft, so that an almost perfect compensation for the rotary forces introduced into the workpiece is possible.

In order to save even more cycle time, all central journals are preferably ground simultaneously. For this purpose a number of grinding wheels corresponding to the number of central journals to be ground simultaneously is simultaneously brought into engagement.

The tools for turning preferably have indexable inserts made of hard metal or polycrystalline diamond; the grinding is carried out by means of galvanically coated grinding wheels or ceramic bonded CBN grinding wheels.

In the method according to the present disclosure the rotary tools are preferably brought into engagement as a first set along one side of the crankshaft, and, by turning, the flat shoulders and incisions at the junction between the bearing journal and the respective flat shoulders are turned. The term "preset turning tools" should be understood to mean that, with the turning tools in one single turning operation with radial advance of the turning tools—relative to the axis of rotation of the crankshaft—the required dimension, namely either the final dimension after the pre-turning operation or the finish dimension after the final turning operation, is reached.

For further improvement of the method according to the present disclosure, a second set of turning tools is preferably added to the first set of turning tools along a side of the crankshaft opposite said first set, wherein the second set is brought into engagement simultaneously with the first set and turns the flat shoulders and incisions. Due to the opposing arrangement of a row of turning tools, not only can the mechanical loading of the turning tools be optimized, but also the forces introduced by the turning tools on the component can also be reciprocally compensated, so that the crankshaft is subjected to a minimal bending load during machining. As a result the manufacturing precision on the crankshaft can also be increased. The respective set is disposed on a carrier.

The indexable inserts made from hard metal or polycrystalline diamond which are used for the turning have the advantage that not all turning tools have to be changed when they are worn, but that only the indexable inserts directly performing the turning operation have to be replaced.

According to a further preferred embodiment of the present disclosure invention, in the method according to the present disclosure the end faces, i.e. the flat ends on the flange side and the journal side of the crankshaft, are produced to a finish dimension by means of milling on a milling centre located before the turning centre. Centring holes are also introduced here for later positioning in the turning centre and the grinding machines.

After the rough grinding a hardening and/or rolling of radii and/or drilling of oil channels and/or nitriding are carried out. These additional steps, which of course form part of the complete machining of the crankshaft, are advantageously implemented before the finish machining thereof.

At the end of the turning of the flat shoulders of the central journals, i.e. immediately following the turning of these flat shoulders, an incision is preferably turned with the same turning tools, as it were in a single operation, wherein this undercut produces the junction between the flat shoulders and the surface of the central journals which extends substantially perpendicular to the flat shoulders. These incisions delimit the region of the central journals which constitutes the immediate bearing surface.

According to a further aspect of the present disclosure, a production line is provided by means of which complete machining at least of unmachined central journals and crankpin journals as well as the respective flat shoulders of forged or cast blanks of a crankshaft which surround the journals, i.e. enclose the journals between them, is carried out. In this connection complete machining should be understood to mean at least the complete machining of the unmachined central journals and crankpin journals and the respective flat shoulders thereof, starting from a forged or cast blank of a crankshaft. According to the present disclosure the production line has a turning centre in which the crankshaft to be machined is fixed. The turning centre of the production line has a linear carrier which extends coaxially with respect to the longitudinal axis of the crankshaft and on which a number of turning tools is mounted such that at least a plurality of flat shoulders of main bearing points or central journal regions can be turned, at least pre-turned, simultaneously. Thus the flat shoulders of the main bearing points should be machined as simultaneously as possible and finished as simultaneously as possible. In this case the turning tools are designed so that at least a pre-turning operation can be carried out. In this case "pre-turning operation" is understood to mean that the greatest possible amount of material is removed from the blank, leaving at most an oversize which is very small relative to the finish dimension and which in the course of subsequent finish machining necessitates a significantly reduced chip volume and reduced machining forces which when introduced into the crankshaft lead to reduced bending forces or bending moments during the finish machining.

The production line also at least includes a rough grinding machine which is disposed after the turning centre and of which the rough grinding wheel has a width which is less than the distance between the flat shoulders between which the central journal to be ground extends. This smaller width of the rough grinding wheel means that only the immediate bearing region is ground, so that during grinding a linear contact is produced which can be readily cooled and lubricated, so that on the one hand the grinding forces are moderate and on the other hand a good grinding result relative to the surface to be ground can be achieved. Due to these improved grinding conditions, in which the rough grinding wheel no longer comes into contact with the already finish-turned flat shoulders of the respective journal point, until on a small oversize the rough oversize of the unmachined crankshaft can be removed by the g machine to leave a small oversize. The small oversize is an oversize which is only delivered for fine machining to a final dimension in a finish machining operation. In this way the rough grinding machine considerably relieves the load on the finish grinding process provided downstream.

The advantage of such a production line is that the substantial wear on the grinding wheels which is otherwise present in the rough grinding or pre-grinding of the flat shoulders no longer occurs, because this part of the pre-machining is performed separately on the turning centre by the turning tools. Since the flat shoulders of the central journals or the main bearing points are considerably larger are than those of the pin bearing points, the serious effect on the wear on the grinding wheels is much more greatly reduced by the production line according to the present disclosure than in the case of grinding of the flat shoulders of the pin bearing points. This may be accepted in the interests of overall economy of the complete machining of crankshafts. For example in car crankshafts the flat faces on the main bearing points have a radial height of approximately 12 mm, whereas the flat faces on the pin bearing points only have a height of approximately 5 mm. These figures are of course by way of example and vary from crankshaft to crankshaft, but should merely serve to clarify the relationship between the height of the flat shoulders of the main bearing points and the pin bearing points.

In order to achieve a high production efficiency, the production line preferably has on the carrier on the turning centre a number of turning tools corresponding to the number of flat shoulders of the main bearing points. The turning tools can preferably be preset individually, so that in one single turning operation the desired final dimensions are achieved, i.e. either the final dimensions for the pre-turning or the final dimensions for the finish turning.

On the turning centre a first and a second carrier are preferably provided, which are disposed with their longitudinal axes parallel to one another and coaxially with respect to the longitudinal axis of the crankshaft, wherein the second carrier is located on a side of the crankshaft opposite the first carrier. Both carriers also have a plurality of turning tools, in particular a number of turning tools which corresponds to the number of flat shoulders the main bearing points. These turning tools disposed on the carrier can be simultaneously brought into engagement with the flat shoulders.

The turning tools preferably have a shape by means of which not only the flat shoulders can be turned, but also by means of which the undercut present in addition to the actual bearing region of the central journals in the junction between the flat shoulder and the diameter region can be finish-turned as an incision. This has the advantage that in one single turning operation, as it were in one go, not only the flat shoulders but also this incision can be produced. According to a modification of the present disclosure the turning tools preferably have indexable insert made from hard metal. Even more preferably, the turning tools have indexable inserts which are made from polycrystalline diamond. The advantage of polycrystalline diamond is that the service life is longer, therefore the production process can be optimized in terms of cost, wherein the gain in service life calculated on the basis of the overall costs of the production process is greater than the loss due to the higher costs of the indexable inserts by comparison with indexable inserts made from hard metal.

On the production line a finish grinding machine 18 is preferably disposed downstream of the rough grinding machine 4. On this finish grinding machine 18, which so constructed that a relatively small oversize 23 left by the rough grinding machine 4 can be removed by grinding, the central journals 10 and the crankpin journals 11 can be finish-ground to the final dimension, preferably in a single operation. On this finish grinding machine the flat shoulders of the crankpins 12 can preferably also be finish-bound in just such a way if they have not yet been ground to the final dimension on the rough grinding machine. This would be possible for example if no special quality requirements have to be set for the flat shoulders of the crankpins 12. Then the finish grinding machine 18 can be spared the step of finish grinding of the flat shoulders of the crankpins 12.

Thus the method according to the present disclosure and also the production line according to the invention offer a cost-effective and highly efficient production method which meets the current precision requirements appropriate manufacturing processes for mass production of crankshafts.

In order further to increase the effectiveness in production, the rough grinding machine preferably has a number of rough-grinding wheels which corresponds to the number of central journals to be rough-ground. This is possible in particular with the central journals which constitute the main bearing points, since these central main bearing points should have equal dimensions as far as possible based on the common longitudinal axis of the crankshaft.

BRIEF DESCRIPTION OF THE DRAWINGS

Further advantages and details of the production line according to the present disclosure or in connection with the production method according to the present disclosure are now explained in detail with reference to the appended drawings. In the drawings:

FIG. 2 shows a crankshaft according to FIG. 1 with a basic representation of first and second carriers in each case with turning tools;

FIG. 2A shows a crankshaft according to FIG. 1 with a basic representation of first and second carriers on which the turning tools are disposed so that a first set turns the left flat shoulder, whilst a second set turns the right flat shoulder;

DETAILED DESCRIPTION

Figure 1:
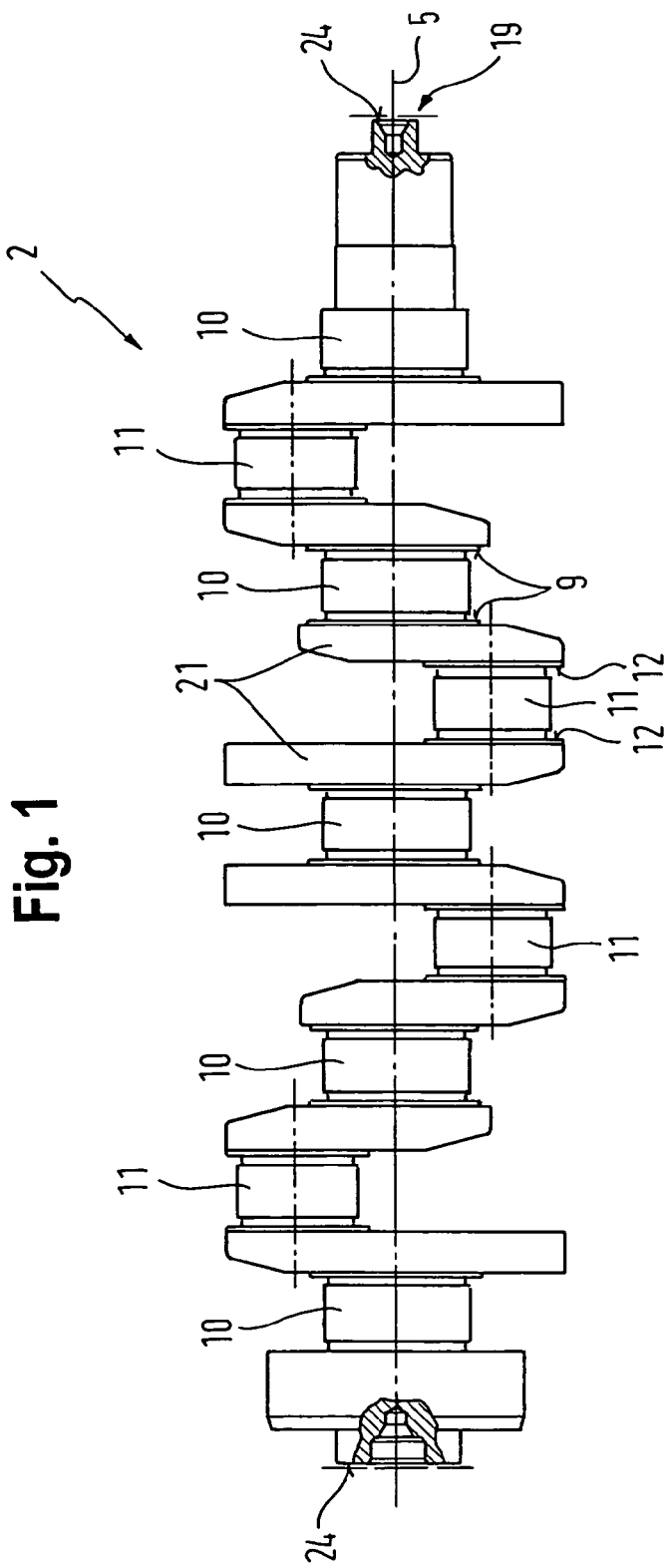
FIG. 1 shows a basic side view of a crankshaft for a four-cylinder engine.

In FIG. 1 a four-cylinder crankshaft is shown in basic side view as a cast or forged blank. This crankshaft 2 has five main bearings 10 and four pin bearings 11, between which flanks 21 are disposed in each case. By way of example be both the main bearings and also the pin bearings are machined on this crankshaft 2. Furthermore there are still other regions present which must be machined in the context of the complete machining of the crankshaft, namely the flat milling of the end faces 24 and the production of centring holes at the ends as well as the machining of the journal side 19 including the machining of the ends there. In the context of the complete machining of the crankshaft on a production line according to the present disclosure, the flat milling of the end faces 24 as well as the introduction of the centring holes constitutes a preceding first operation which is also designated as machining of the ends.

In FIG. 2 the crankshaft according to FIG. 1 is shown in a basic representation with turning tools 8 disposed on carriers 6, 7 for turning of the flat shoulders 9 according to the present disclosure by means of the turning centre of the production line. After the centring holes have been introduced on the end faces 24 of the crankshaft in the preceding first working step, in the context of the production line the crankshaft 2 is gripped in a turning centre 3 in which according to FIG. 2 the left side of the crankshaft is held by a workpiece headstock with workpiece drive and the right side of the crankshaft is held by a tailstock with the tip as support. For the sake of clarity both the workpiece headstock and the tailstock are not shown. In plan view a first carrier 6 to hold turning tools 8 and a second carrier 7 likewise to hold turning tools 8 are disposed on each side of the crankshaft, extending longitudinally parallel to the longitudinal axis 5 of the crankshaft 2. The first carrier 6 can be advanced via an advancing axis X2 and the second carrier 7 can be advanced via an advancing axis X1 to the main bearing 10 of the crankshaft 2. The two tool holders are likewise movable in the longitudinal direction of the crankshaft along the CNC axes Z1 and Z2. On each carrier are located as many turning tools 8 as there are flat shoulder 9 to be turned adjacent to the central journals such as the main bearing or on the ends or to the flange side. The turning of the flat shoulders 9 of the central journals 10 with the turning tools 8 disposed on the respective carriers 6, 7 constitutes the actual first working step in the complete machining of crankshafts according to the present disclosure. In this case the turning tools 8 are only shown in basic plan view shown, wherein in an enlarged representation of the detail X in FIGS. 4, 5, 6 the details of the turning operation are shown and in FIG. 8 the details of the grinding operation are shown. In an enlarged representation of said Figures the basic structural characteristics of the turning tools 8 disposed on the turning tool holders can be seen.

The sets of turning tools are mounted in the turning centre so that they can be preset as a tool set or also individually. The arrangement of several turning tools on a respective carrier means that in the turning centre an adjustability of the carrier in the X1 or X2 direction as well as the Z1 or Z2 direction is provided. In this case the adjustability of the carrier in the X direction corresponds to the advance during the turning of the flat faces, whereas the adjustability in the Z direction serves to position the turning tools in their exact longitudinal position with respect to the incision into the respective journal region for simultaneous turning of opposing flat shoulders. In order to make the machine appropriately flexible for different crankshafts, it may be advantageous to divide the carrier into a plurality of parts, in which case an adjustability in an X and a Z direction must then be provided for each carrier. As a result the turning centre is technical more costly and more complicated, but it offers greater flexibility in its application to different requirements in the complete machining of crankshafts. Moreover, the turning tools are individually adjustable, which can be carried out manually or automatically.

The advantage of the arrangement of the turning tools 8 according to FIG. 2 opposite one another is that forces which are introduced during turning and can lead to deformation of the crankshaft can be absorbed or compensated for by the opposing counterpart. By this turning of the flat shoulders 9, regardless of bending, in the region of the central journal 10 of the crankshaft 2 the precision of production of the crankshaft can be further improved. As the turning tools are brought into engagement simultaneously on the crankshaft from two opposing sides, in addition to the increased precision in the production of the crankshaft the machining times are also reduced.

FIG. 2A shows an arrangement of the turning tools on the two carriers which serve as tool holders in such a way that flat shoulders 9 are always turned on one and the same side of the respective central journal, wherein the set of turning tools disposed on the carrier 6 turns the left flat shoulder and the further set of turning tools disposed on the carrier 7 turn the right flat shoulders of the central journals. Thus a width correction of the journal points or bearing points can also be achieved via the axes Z1 and Z2. This has the advantage that the width of the bearing points does not have to be corrected solely by the presetting of the turning tools, but also by the CNC axes Z1 or Z2.

Figure 2B:
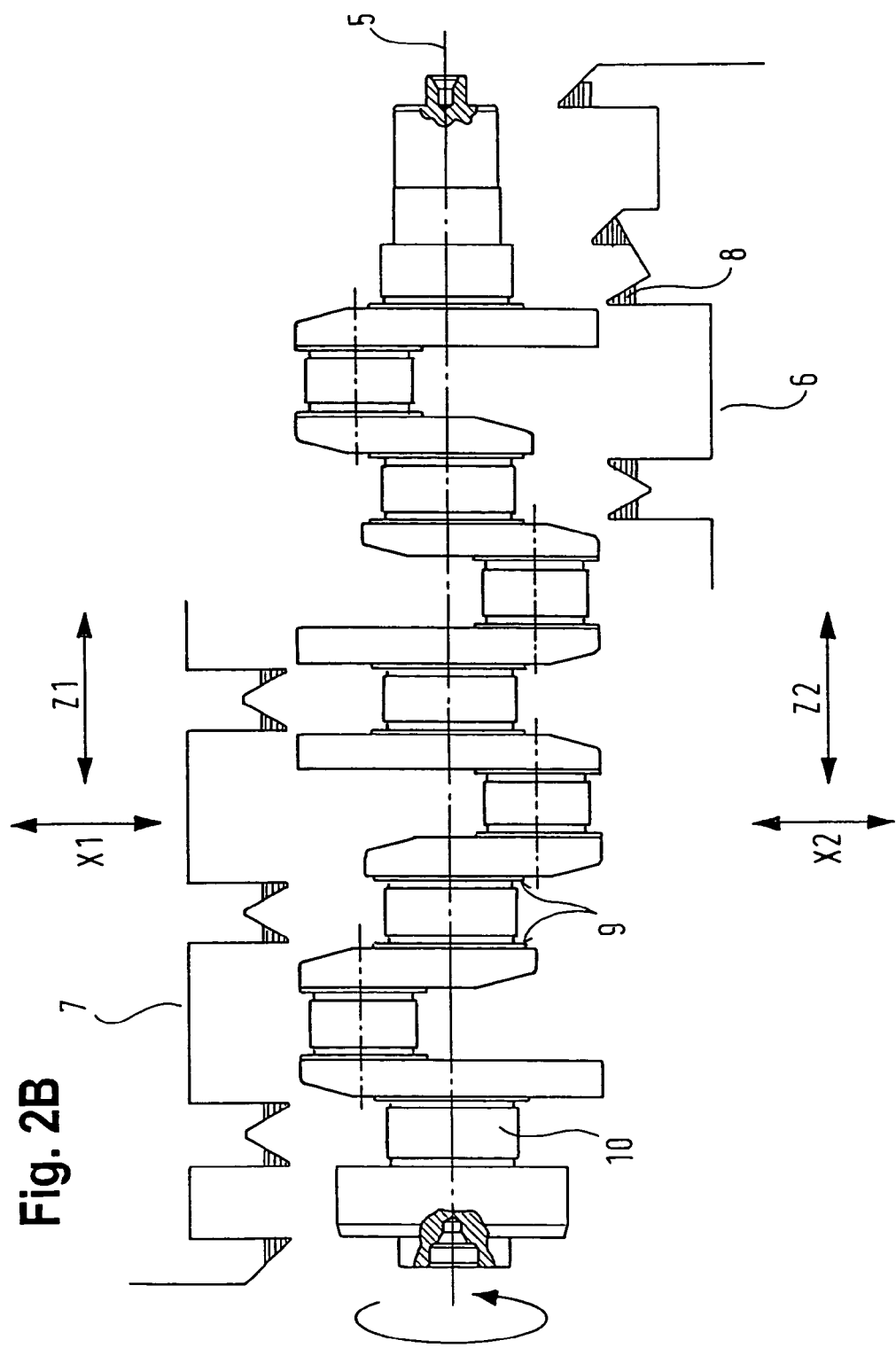
FIG. 2B shows a crankshaft according to FIG. 1 with a basic representation of first and second carriers, wherein each carrier has a group of turning tools for turning a predetermined number of flat shoulders.

FIG. 2B shows an arrangement of the turning tools on the two carriers 6, 7 which serve as tool holders according to a further embodiment which differs from the one according to FIG. 2A in that the respective carriers 6, 7 carry defined groups of turning tools 8 by which defined groups of flat shoulders 9 of the central bearings are turned. Depending upon the crankshaft to be produced, the division of the groups or working ranges for turning of the flat shoulders may be designed so that optimal technological parameters are produced with regard to the turning. Also in these carriers, which do not extend over the total length of the crankshaft, the turning tool sets can again be advanced or adjusted or moved in the longitudinal direction of the crankshaft via respective CNC axes for an advance in the X1 or X2 direction and in the Z1 or Z2 direction.

Figure 3:
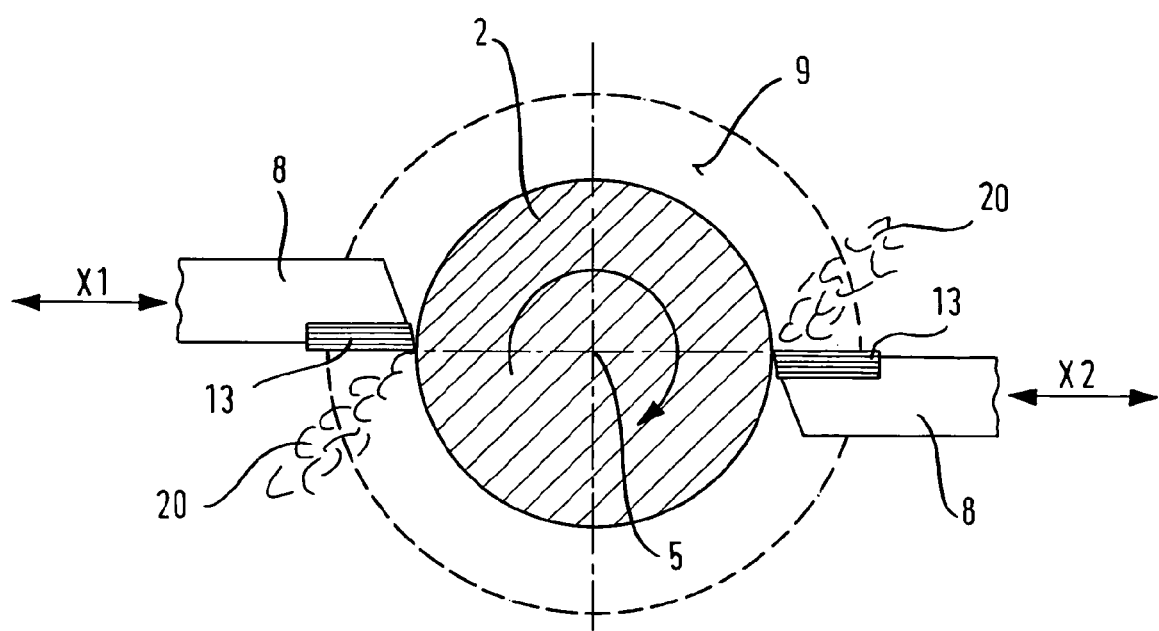
FIG. 3 shows a sectional view through a main bearing of a crankshaft with opposing turning tools simultaneously in engagement for turning a flat shoulder.

FIG. 3 shows a sectional view through the bearing journal of a main bearing of the crankshaft 2. The arrow indicated around the longitudinal axis 5 of the crankshaft shows that the crankshaft is driven and set in rotation by the workpiece headstock for machining of the crankshaft. In this sectional view the flat shoulder 9 is shown, in which simultaneously the opposing turning tools 8 are represented in engagement, so that chips 20 are removed in each case by the turning tools 8. Because with the advancing movement according to the advancing axes X1 and X2 both turning tools are advanced simultaneously, a high chip volume is produced during turning with simultaneous compensation for the forces resulting from the machining and introduced into the crankshaft.

Figure 4:
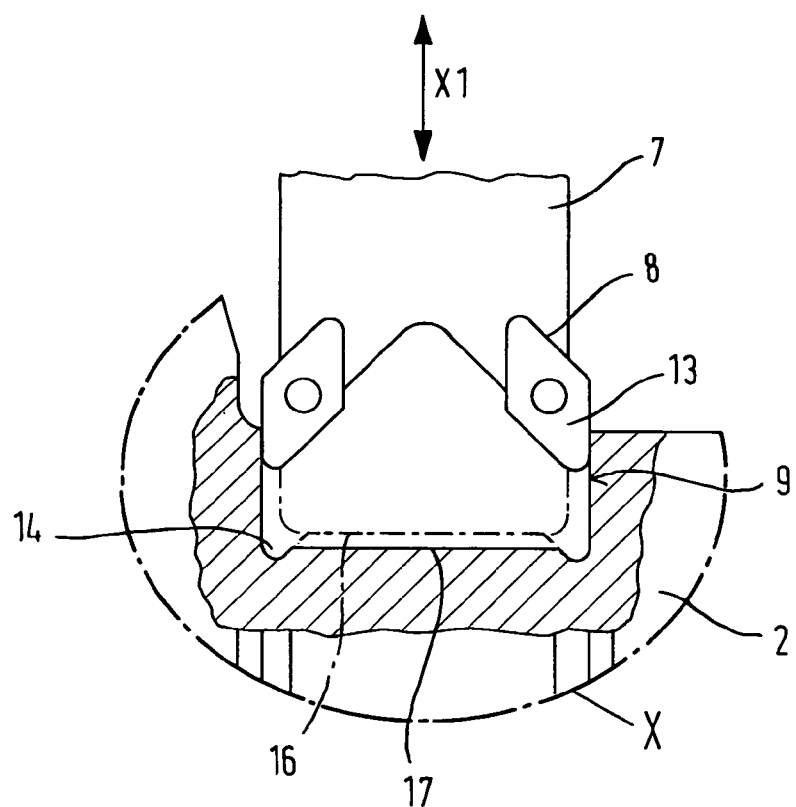
FIG. 4 shows on an enlarged scale the detail X according to FIG. 2 with turning tools which have just come into engagement with the flat shoulders.

FIG. 4 shows the detail X according to FIG. 2 showing a part of the second carrier 7 which carries an indexable insert 13 as turning tool 8 on each side. The indexable inserts 13 have just penetrated into the region of the central journal 10, which is a main bearing, and have started to turn the flat shoulders 9. These indexable inserts 13 are either formed from hard metal or from polycrystalline diamond. These indexable inserts 13 can be preset, i.e. they can be set to the dimension to be turned so that with a single incision into the bearing region the flat shoulders 9 can be turned to the required dimension. In this case the required dimension is the dimension after the turning operation. The indexable inserts 13 have, on their front tip oriented in the direction of penetration, a shaping by which the incision 14 is turned in the junction between the flat shoulders 9 and the actual bearing region of the main bearing. This incision 14 forms an undercut for the immediate bearing surface in the diameter region of the bearing. The illustrated front face of the second carrier 7 which carries the two indexable inserts 13 has an opening in the middle so that in the immediate bearing region of the main bearing 10 after the turning of the flat faces 9 and the incisions 14 the rough contour 16 is still maintained in the region of the bearing. Thus the turning operation for the flat shoulders 9 and also of the incisions 14 is dissociated from the production of the desired bearing surface in the diameter region.

Figure 5:
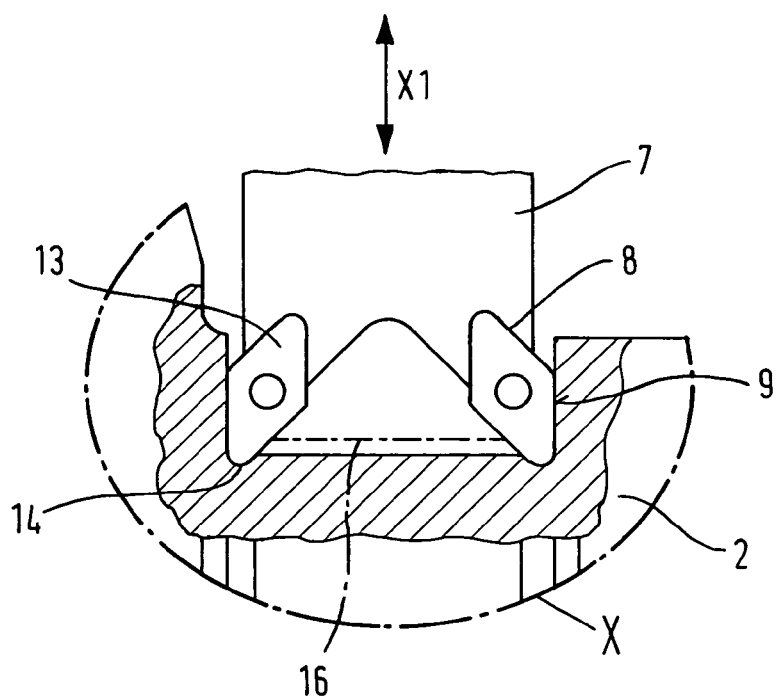
FIG. 5 shows the detail X according to FIG. 2 with turning tools worked into the incisions.

Finally, FIG. 5 shows the detail X according to FIG. 2 in which, however, in contrast to the illustration according to FIG. 4, the second carrier 7 has been advanced in the direction of the advancing axis X1 to the extent that the flat shoulders 9 have been turned by the preset indexable inserts 13 to the required intermediate or final dimension, wherein simultaneously the incisions 14 have been turned adjacent to the immediate bearing surface in the diameter region of the main bearing. The grinding operation which follows this working step can be carried out with complete relief from loading of the side faces of the grinding wheel 22. Thus without being clamped between the flat shoulders during grinding of the actual journal surface, the grinding disc 22 can move inside the region of the bearing point at least by a certain amount in the Z direction, but without touching flat shoulders at all. Thus the extreme loading for a grinding wheel on the outer edges and lateral flanks, such as occurs in the case of plunge grinding, is eliminated.

Figure 6:
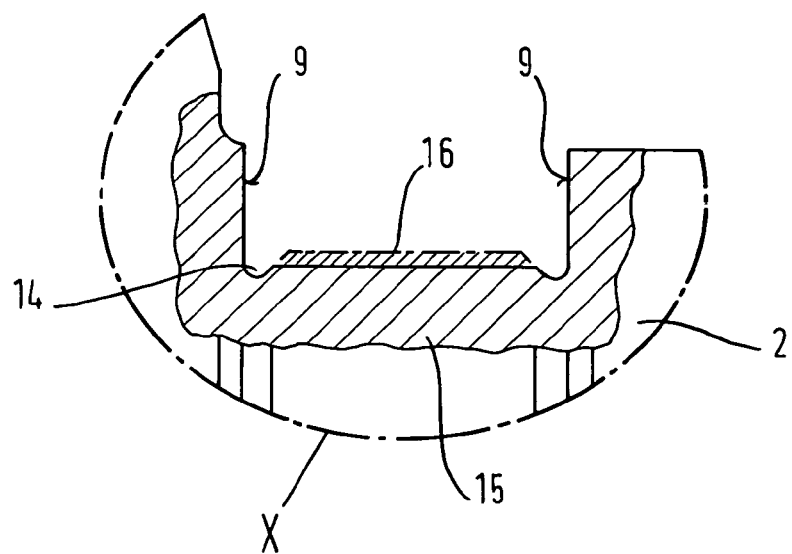
FIG. 6 shows the detail X according to FIG. 2 after the turning operation has ended.

Finally, FIG. 6 shows the detail X according to FIG. 5, in which for greater clarity the carrier with the turning tools is not shown, because this has for example been moved back again. It can be clearly seen in the immediate bearing region between the incisions 14 that the rough contour 16 is still maintained, i.e. the journal surface of the bearing journal 15 is not yet machined. Both flat shoulders 9 have been turned to an intermediate dimension or also to a final dimension—depending upon the required production technology.

Figure 7:
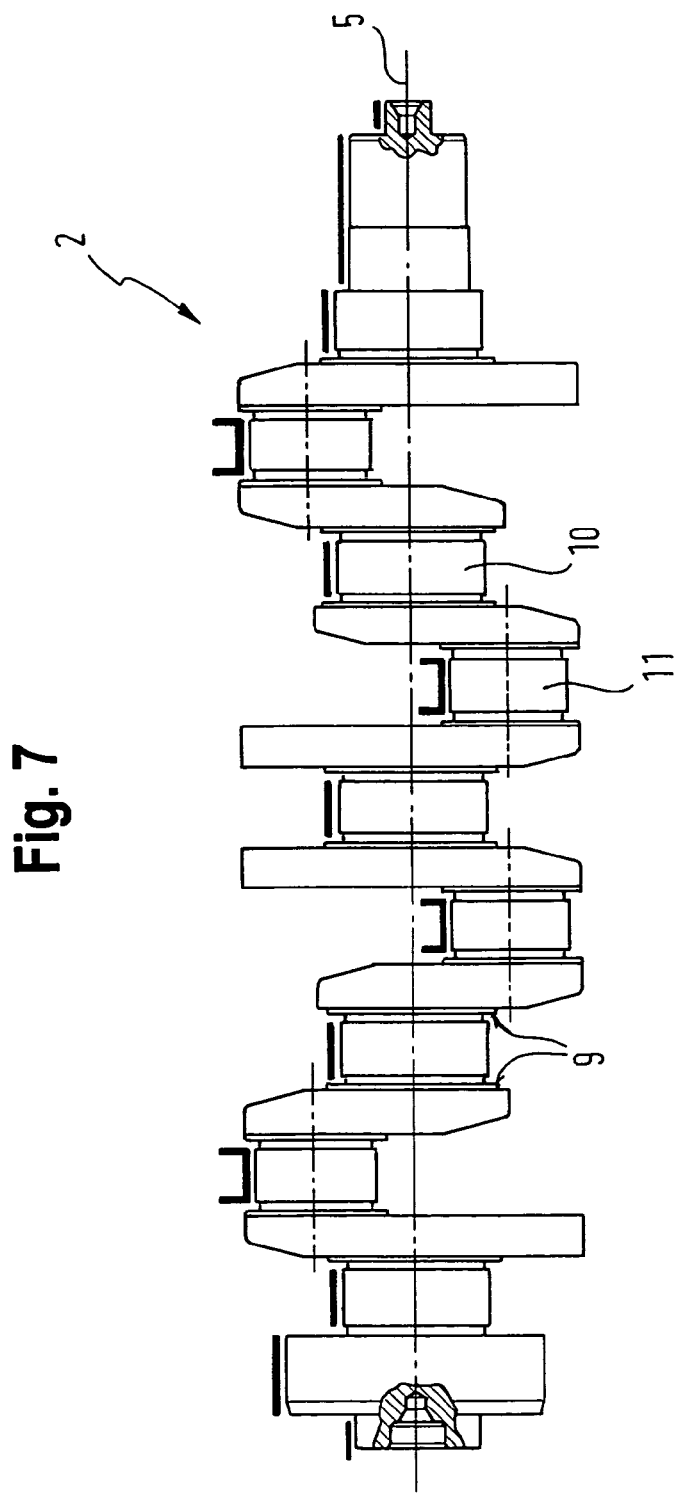
FIG. 7 shows the crankshaft according to FIG. 1 with identification of the regions for grinding.

FIG. 7 shows the crankshaft 2 according to FIG. 1 displayed and identifies all the surfaces provided for grinding. During the grinding machining the crankshaft 2 is driven in rotation about its longitudinal axis 5 in a manner which is known per se. After conclusion of the to signature of the rough-grind located before turning of the flat shoulders 9 of the central journals 10 preferably to the finish dimension (finish turning), which precedes the rough grinding, in this working step the regions shown in FIG. 7 are ground by means of a rough grinding machine 4 for rough grinding of the central journal points and the pin bearing points.

After the flat shoulders 9 have been turned in the context of the first working step, the loading of the grinding wheel becomes significantly less during the rough grinding of the journals because the plane grinding of the high flat shoulders on the central journals is omitted completely, at least in the case of pre-grinding. Thus even the loads already introduced into the crankshaft 2 during rough grinding are significantly reduced, so that during the machining a negative bending effect on the crankshaft 2 is minimized.

This new sub-division/splitting of the grinding operation, which goes against the technological trend, into a separate turning operation preceding the grinding operation or the replacement of the trochoidal milling or turn broaching by the turning of the flat shoulders 9 leads to a reduced outlay for rough grinding due to the omission of the machining of the flat shoulders 9, so that the service life of the grinding wheels is considerably increased and simultaneously the quality of machining of the crankshafts is improved.

Figure 8:
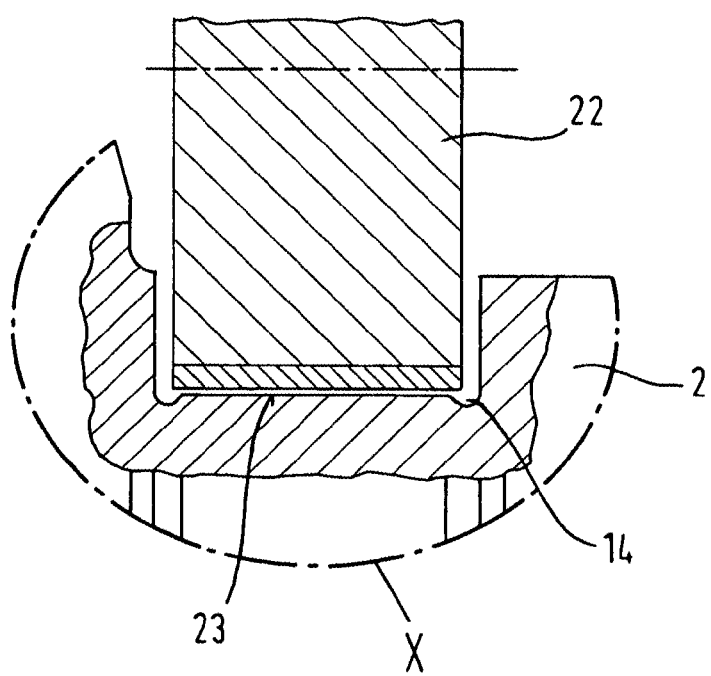
FIG. 8 shows the detail X according to FIG. 2 with a grinding wheel disposed in the main bearing region on the finish grinding machine.

Finally, FIG. 8 shows the detail X according to FIG. 2 with a grinding wheel arranged for rough grinding of the diameter regions of the bearing journals. In the present case this involves the grinding of the bearing journal 15 a main bearing. For the grinding wheels 22, galvanically coated grinding wheels are preferably used for rough grinding of the journals of the cast or steel crankshafts. CBN grinding wheels with ceramic bonding are preferably used for finish grinding of the respective bearing points. These each have a substantial service life and moreover enable a high grinding precision, so that they are predestined for use in the context of a production line for crankshaft manufacture. Because of the "freeing" of the machining the flat shoulders 9 from the rough grinding operation the rough-grinding wheels can grind much closer to the final dimension, so that the grinding constitutes machining optimized for the oversize.

The arrangement of the turning tools in opposing engagement during the turning also ensures the compensation of loads otherwise introduced by the machining tool into the workpiece to be machined, so this has a positive effect overall on the production precision.

Figure 9:
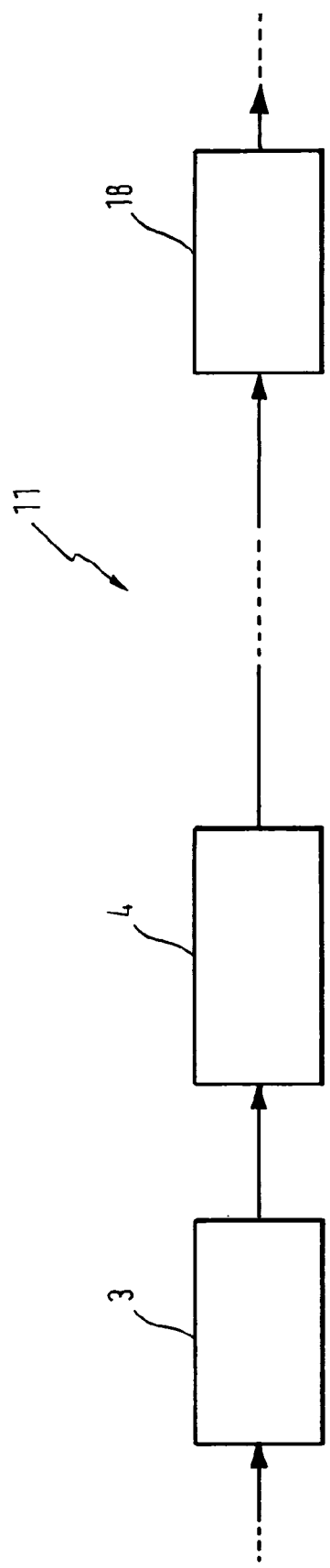
FIG. 9 shows a basic arrangement of the machine tools belonging to the production line in one embodiment.

FIG. 9 shows in a schematic representation the basic structure of a production line 1 for carrying out the method according to the present disclosure. According to the present disclosure the essential components of this production line 1 are the turning machine or the turning centre for turning the parts with flat faces in combination with a rough grinding machine. The sub-division the machining operations is carried out in such a way that during turning the flat shoulders of the central journals are turned. These are difficult to produce by grinding, since no acceptable service life for the grinding wheel can be achieved here. By this combination of the turning machine and the rough grinding machine the machines can each be assigned to the processes which can be implemented with the respective technology better, more cost-effectively and more advantageously for the quality of the crankshaft. For this reason the flat faces of the central journals and the incision in the main bearing points are machined on the turning machine. Thus the grinding wheels by which the central journals like the main bearings are ground are significantly relieved of load in terms of wear.

As the oversize on the crankshaft blank is largely removed by rough grinding on the rough grinding machine and the machining of the flat shoulders of the main bearings is separated from the grinding process which is customary in the prior art and takes place by turning, for the second grinding machine, the finish grinding machine, there remains only a small possible oversize preferably only for fine machining, so that the service life of the grinding wheel of a finish grinding machine is significantly increased relative to a grinding wheel of a conventional grinding machine in the prior art by means of which finish grinding is performed. Furthermore during the finish machining the forces introduced into the crankshaft by the machining tool are reduced, which has a positive effect on the precision of the crankshaft.

A milling machine by means of which the end faces 24 of the crankshaft are in particular face-milled precedes the production line 1. Likewise as preparation centring holes are introduced.

The machining of the flat ends on the crankshaft and the introduction of the centring holes is followed by the turning on a turning centre and the rough grinding of the crankshaft on a rough grinding machine. After this machining, further machining steps take place on the crankshaft, such as for example deep hole drilling, creation of incisions, heat treatments (such as hardening and tempering), machining of the ends etc. (shown by the dots in FIG. 9). These machining processes vary depending upon the design of the crankshaft, i.e. machining processes can be omitted or added. After these machining processes the crankshafts are then finish-ground on their main bearings and pin bearings and also on their ends (flange/journal). After the finish grinding, further machining operations take place such as for example balancing, super finishing, final measurement etc.

Thus a reduced number of machines is required by the arrangement according to the present disclosure or the method according to the present disclosure relative to production lines according to the prior art. By the reduction of the number of machines the technological expenditure and thus the production costs for the crankshafts in mass production can be further reduced. This likewise has a positive effect on a reduction of the costs for the handling systems as well as the installations for supplying the coolant and lubricant.

Figure 10:
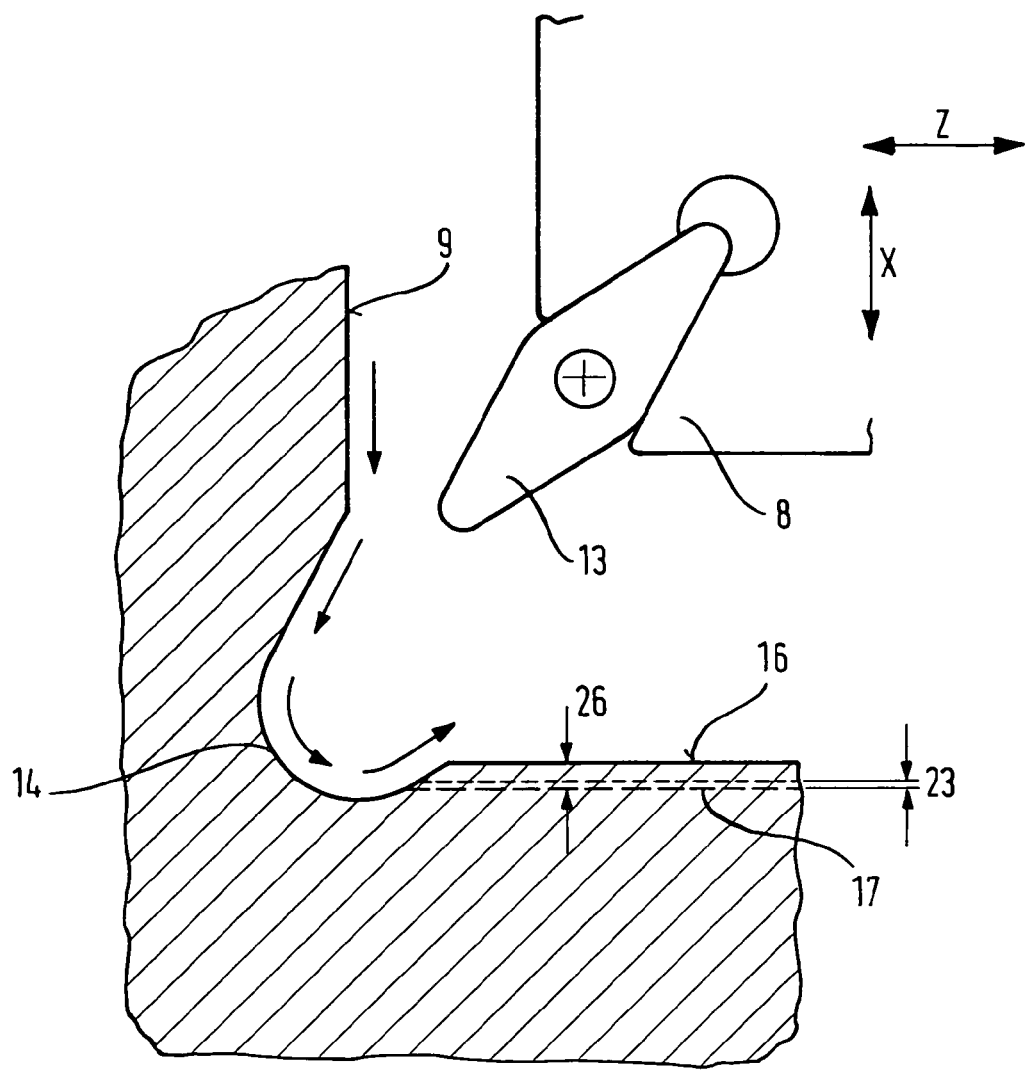
FIG. 10 shows a representation of the incision region with associated turning tool and indexable insert mounted thereon as well as a rough contour of a journal.

The method according to the present disclosure and the implementation thereof on the production line according to the present disclosure are explained again in summary with reference to FIG. 10. FIG. 10 constitutes an enlarged representation of a part-region of a central journal in which a turning tool 8 with an indexable insert 13 is shown on an enlarged scale. The flat shoulders 9 are turned adjacent to the immediate bearing point of the central journal by the rotary tool 8 which can be advanced on a CNC axis both in the X direction and in the Z direction. The flat shoulders 9 are preferably finish-turned, so that in later machining steps these flat shoulders 9 no longer have to be ground. The rough contour 16, which differs by an oversize 26 from the final contour 17, is shown for the actual bearing point. The oversize 23 which is produced after the rough grinding is likewise shown. It can be seen from this that the predominant part of the oversize 26 is removed by means of the rough grinding, wherein the rough grinding is brought as close as possible to the final dimension, i.e. the final contour 17. This is possible in that the grinding wheel for rough grinding is not subjected to the usual severe wear and loading as in the prior art, where both the flat faces and also the journals are ground. As the rough grinding produces grinding which is optimized in relation to the oversize in such a way that only a small oversize 23 relative to the final contour 17 can remain, the rough grinding already ensures that in the case where finish grinding is carried out later the loads on the finish-grinding wheels are lower on the one hand and on the other hand in addition to the increase in their service life the load introduced into the workpiece during grinding is lower, so that a higher precision of the crankshaft can likewise be achieved during finish grinding.

The illustrated CNC axes X and Z make it possible that after the turning of the flat shoulders 9 is concluded, by means of an interpolating movement of the X and Z axis the incision 14 can be turned adjacent to the immediate bearing point. This is particularly advantageously possible using the arrangement of the turning tools according to FIG. 2A.

With the method according to the present disclosure and the production line which implements this method, considerable savings are achieved in the mass production of crankshafts, wherein in addition to the significant increase in the number of cycles the service lives of the grinding tools used are significantly increased and furthermore the quality of the precision of the crankshaft produced thereby is significantly higher relative to conventional methods.

The invention claimed is:
1. Method of complete machining at least of unmachined central journals and crankpin journals as well as respective flat shoulders of forged or cast blanks of a crankshaft which surround the journals, wherein the method comprises:
  a) first, only turning the flat shoulders associated with central journals of the crankshaft;
  b) then, rough grinding the central journals without rough grinding their flat shoulders and rough grinding the crankpin journals while also rough grinding flat shoulders (12) of the crankpin journals, wherein the rough grinding occurs until an oversize remains on the central journal, the oversize being smaller than a conventional oversize, which necessarily remains if the rough grinding of the flat shoulders takes place after a conventional procedure including rough grinding, turn broaching or trochoidal milling; and c) thereafter, finish grinding the central journals and the crankpin journals to a final dimension from the smaller oversize achieved by the rough grinding.

2. Method as claimed in claim 1, wherein the flat shoulders of the crankpin journals are finish-ground to the final dimension from the smaller oversize left by the rough grinding.

3. Method as claimed in claim 1 wherein the flat shoulders of a plurality of central journals are turned simultaneously.

4. Method as claimed in claim 1, wherein the flat shoulders of the central journals are turned in groups, wherein at least a first group is turned from a first side of the crankshaft and a second group is turned from a second side of the crankshaft opposite the first side.

5. Method as claimed in claim 4, wherein the first and the second group each comprise all flat shoulders of the central journals.

6. Method as claimed in claim 1, wherein the central journals are ground simultaneously.

7. Method as claimed in claim 1, wherein the turning is carried out by means of tools with indexable inserts made from hard metal or polycrystalline diamond and the grinding is carried out by means of galvanically coated or ceramic bonded CBN grinding wheels.

8. Method according to claim 1, wherein both end faces of the blank of the crankshaft are machined before turning, and centring holes are introduced into these end faces before the turning.

9. Method as claimed in claim 1, wherein after the rough grinding, the method comprises carrying out at least one of:
   (a) a hardening,
   (b) a rolling of radii,
   (c) a drilling of oil channels, and
   (d) a nitriding.

10. Method as claimed in claim 1, wherein following the turning of the flat shoulders of the central journals incisions are each turned simultaneously in a junction of the flat shoulders with a surface of the journals extending substantially perpendicular thereto.

* * * * *